UNITED STATES PATENT OFFICE.

RAYMOND M. CHAPMAN, OF HAMMOND, INDIANA, ASSIGNOR OF ONE-HALF TO ROBERT W. CHAPIN, OF CHICAGO, ILLINOIS, AND ONE-HALF TO GEORGE M. CHAPIN, OF HAMMOND, INDIANA.

VEGETABLE-IVORY MEAL AND METHOD OF MAKING SAME.

1,260,327.   Specification of Letters Patent.   Patented Mar. 26, 1918.

No Drawing.   Application filed December 29, 1917. Serial No. 209,393.

*To all whom it may concern:*

Be it known that I, RAYMOND M. CHAPMAN, a citizen of the United States, and a resident of Hammond, in the county of Lake and State of Indiana, have invented certain new and useful Improvements in Vegetable-Ivory Meal and Methods of Making Same, of which the following is a specification.

"Vegetable ivory" is a white horny substance formed by the last natural stages of hardening of the interior of the seed or nut of the palm-like plant *Plytelephas macrocarpa*. In commerce this seed is commonly called the corozo nut, and varies in size from half an inch to several inches in diameter. It is a native of South America, being found in great quantities along the Magdalena river in Colombia, where it is known as "tagua," and also in Peru and in the forests of Northern Ecuador. It is extensively imported into the United States and used in various industrial arts, largely in the manufacture of buttons, trinkets, and other useful or ornamental articles. The scrap or waste fragments and the defective nuts from the factories, as well as to some extent the sound nuts, have been utilized in the formation of various chemical products, some of which products have been used in making explosives. The raw nut meal has been demonstrated to have a value as animal feed, being rich in carbohydrates.

The nut material is exceedingly hard and tough, and is somewhat elastic. So hard and tough is it, indeed, as to defy reduction to meal by powerful grinders and attrition mills except through a large number of successive operations and at an enormous cost of power and wear and tear upon the apparatus.

My present improvements have as one prime and specific object the provision of a method for rendering this ivory nut material readily and cheaply available for use as an animal feed, and, secondly, to provide comminuted ivory nut material of a character which may be used as a feed and which is more palatable, more digestible and having higher food values than has the raw material. Broadly the invention is directed to a method for cheaply and easily reducing the nut material to finely comminuted form.

Heretofore the only use made of this material for feeding purposes, so far as I am aware, has been in making tests of its digestibility and food value. In other words it was experimental only, or in the nature of a laboratory test. The material used was in the raw state ground to suitable fineness. Hitherto the method of reduction has been too difficult and costly to admit of its use as a feed otherwise than for purely experimental purposes.

The first step of my new method is to subject the nut material to the action of an acid bath. In my practice I employ the scraps or residue from factories which make buttons, etc., from the nut. The larger pieces may be segregated from the smaller, placing them respectively in wooden tanks adapted to hold the acid solution. The solution which I employ, and which I consider the preferred solution, is one and one-half per cent. to two per cent. of sulfuric acid, $H_2SO_4$, in water. The nut material is allowed to remain in the solution from six to twelve hours, the former period being sufficient for the smaller and the latter for the larger pieces. Considerable latitude as to the period of submersion in the bath is allowable as I have not found that any material difference in result is noticeable from several hours' longer submersion than indicated or in a submersion an hour or so less. The desideratum is to have the pieces permeated throughout by the solution, and this depends upon the size of the pieces.

Sulfuric acid is preferably employed by me because of its cheapness and availability, the substantial absence of fumes therefrom, its negligible action upon the reducing apparatus, its relative safety in handling and its avoidance of objectionable elements in the final product when used as a feed, and, importantly its marked superiority for attaining the desired results. It is pointed out also that the use of an alkali solution bath, for instance, that of sodium hydroxid, NaOH, tends to put part of the mass into solution, defeating the purpose, which is to retain the material in solid form. The alkali and many other acids are also difficultly washed out, while the sulfuric acid is easily washed away to the desired extent. The use of nitric, hydrochloric, oxalic, acetic and tartaric acids severally in the soaking solution, as well as sodium hydroxid, does not in any case produce nearly as great a degree of friability after roasting as does the sulfuric acid.

At the end of the period of immersion in the acid bath, and as the second step, which is preferably but not necessarily taken, the material is washed with water to remove the surface acid therefrom. For this purpose I place the material in an open-work wooden crate and by means of suitable tackle lower and raise the crate several times into and out of a vat of clear water. The excess of water is then allowed to drain off.

The third step is to heat the material. In my practice this is done by placing the material in a roaster having a hollow metallic cylinder five feet long and two and one-half feet in diameter mounted to rotate over a coke fire, such roasters being well known. Other forms of heating devices may be employed. The material is raised to a temperature approximately from 280° F. to 320° F. for approximately fifteen minutes at the lower temperature to approximately five minutes at the higher degree named. The desideratum in this respect is to raise the material to a degree of heat at which the moisture within the pieces is driven off fairly rapidly, but which heat is preferably not high enough to char or burn the product. It is pointed out that charring would reduce the proportionate quantity of food values otherwise obtained.

After so heating the material the fourth and last step is taken, namely, to reduce the material to comminuted form. I do this by means of an ordinary attrition mill. Well known crushers, grinders and mills found serviceable in reducing to meal and flour such substances as grains, pressed cotton seed and linseed cakes may be employed.

After coming from the roaster or heating device the material is found to be quite friable and may be ground to meal with about the same expenditure of energy as is required for similarly reducing pressed cotton seed or linseed cakes after the same have been broken up into particles similar in size to those of the roasted ivory nut.

Since sulfuric acid requires about 400° F. for evaporation, my present understanding is that the presence of the acid reduces the tendency of the material to char at the temperatures named. My understanding is also that the sulfuric acid acting upon the material forms a quantity of soluble mannose from insoluble mannan, converts certain of the starch into dextrose, and decomposes the binding materials, such as resins, around the fibers of the cellulose, leaving the latter substantially unchanged, while freeing the fat from the resinous substances. An auxiliary advantage of acid in the treating solution in its effect prevents the molding of the mass, which occurs within a few hours after the material is made wet merely with water. My understanding of the action of the heat is that it causes the minute particles of moisture throughout the pieces to expand through their conversion into vapors separating the particles of cellular tissue, etc., and leaving the mass in a porous and friable state. In addition caramelization takes place and probably other decompositions such as occur in baked food products.

It is pointed out that soaking the mass in water followed by heating fails to render the product friable or to reduce materially, if to any extent whatever, its hardness.

I find that the material is more satisfactorily operated upon in the reducing mill if the heating is performed shortly after the acid bath step has been taken. I attribute this to the fact that upon exposure the soaked material naturally begins to dry out and the effect of the moisture to induce expansion throughout each piece is proportionately lost.

To indicate the relative hardness and toughness of the raw ivory nut pieces as compared with the same kind of material treated according to these improvements I may mention that twenty successive grindings of the raw material were required to produce a comminution of particles of the same relative quantities and fineness as was obtained by a single grinding of the treated material. The test was with sixty mesh, eighty mesh, and one hundred mesh screens, and the grindings of the raw material were continued until substantially the same amount of material remained on each screen as in the case of the treated material. It is substantially accurate to say that various costly elements of reduction, such as time, and energy expended, and the destructive wear of the apparatus, are severally in the ratio of one to twenty in favor of the treated as against the raw material.

My new material in its finely ground state is soft and mealy, of a light brown or tan color, has a sweetish and agreeable nut-like smell and taste, and has also the characteristic taste of a baked product. After coming from the roaster or from the attrition mill the material will absorb atmospheric moisture up to at least six per cent., according to my observation. I concurrently analyzed raw and treated material from the same original bulk, on substantially the same basis of moisture content, and found that the protein content was slightly increased; that the fat analysis for the raw material showed 1.00% while that for the new material showed 1.36%; that the fiber content was slightly increased; that the ash content was also slightly increased; and that the nitrogen-free extracts were respectively 75.50% for the raw material and 75.82% for the new material. The water solubility of the raw material was found to be 7.75% while for the new material it was 8%. In a prior analysis by others of such raw nut meal the average fat content of nine samples was found to be .92%.

I consider the value of the new material as a food element to inhere to a considerable extent in the porous nature of the particles, whereby the action of the digestive juices upon them may be completely had. The largely increased amount of fat available for nutrition is obviously also a notable advantage.

In preparing dairy feed in which the treated vegetable ivory material is used, I supply the proper protein elements, together with palatable elements such as molasses absorbed by oat hulls or other fibrous materials of various kinds, adding thereto the vegetable ivory meal, which supplies the major portion of the carbo-hydrate element.

In mixed feeds of the above described class, various different materials are used at different times and under different specifications. For instance, there are incorporated in feeds of this class such materials as gluten meal, soya bean meal, cotton seed cake, linseed oil cake meal, palm nut meal, cocoa-nut meal, velvet bean meal, dried brewers' grains and dried distillers' grains. Such materials are usually described as protein feeds, and provide largely the protein and fat content. By applying with such materials, or some of them as required in any given case, a proper quantity of the new vegetable ivory meal, a balanced feed or ration is obtained. No proportions need to be given here as those skilled in the art will readily combine the various ingredients according to the particular result they desire to attain.

I claim:

1. The method of reducing vegetable ivory material which includes subjecting it to the action of a liquid which permeates the cells and tissues thereof, heating the material, and dividing it into relatively fine particles in any approved way.

2. The method of reducing vegetable ivory material which includes subjecting it to the action of an acid solution, heating it to a condition of friability, and dividing it into relatively fine particles in any approved way.

3. The method of reducing vegetable ivory material which includes subjecting it to the action of a dilute sulfuric acid solution, heating it to a condition of friability, and dividing it into relatively fine particles in any approved way.

4. The method of reducing vegetable ivory material which includes subjecting it to a dilute sulfuric acid bath until the material is permeated thereby substantially throughout, heating the material sufficiently to drive off the moisture rapidly enough to produce friability thereof, and breaking up the material into relatively fine particles in any approved way.

5. The method of reducing vegetable ivory material which includes subjecting it to a dilute sulfuric acid bath until the material is permeated thereby substantially throughout, washing the material, heating the material sufficiently to drive off the moisture rapidly enough to produce friability thereof, and breaking up the material into relatively fine particles in any approved way.

6. The method of reducing vegetable ivory material which includes subjecting it to a dilute acid bath containing between one per cent. and two per cent. of sulfuric acid in water, heating the material to a temperature between approximately 280 degrees F. and 320 degrees F. for a time sufficient to produce friability, and then dividing the material into relatively fine particles by any approved means.

7. Vegetable ivory material in a friable condition.

8. Vegetable ivory material in a finely divided and friable condition.

9. Vegetable ivory material having a sugar element thereof in the form of caramel.

10. Treated vegetable ivory material that averages substantially one-third of one per cent. higher in fat elements available for animal digestion than is contained in a similar average of the raw material.

11. Ivory nut material in comminuted form having a sweetish taste and smell, which is of substantially tan color, and which has a chemical composition containing mannose.

12. Vegetable ivory material in a porous condition and in finely divided form containing mannose, dextrose and a relatively high percentage of substantially free fat.

RAYMOND M. CHAPMAN.